(12) United States Patent
Morgan et al.

(10) Patent No.: US 8,254,579 B1
(45) Date of Patent: Aug. 28, 2012

(54) CRYPTOGRAPHIC KEY DISTRIBUTION USING A TRUSTED COMPUTING PLATFORM

(75) Inventors: Jeffery A. Morgan, Cupertino, CA (US); John C. Schettino, San Jose, CA (US); Chandrasekar Venkatraman, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1541 days.

(21) Appl. No.: 11/700,446

(22) Filed: Jan. 31, 2007

(51) Int. Cl.
*H04L 29/06* (2006.01)

(52) U.S. Cl. ............ 380/278; 380/277; 380/279; 713/1; 713/150; 713/164; 726/6; 726/7

(58) Field of Classification Search .............. 713/1, 150, 713/153, 164, 168, 170, 171; 726/5, 6, 7, 726/27, 29, 30, 18; 380/255, 277, 278, 279, 380/282, 286, 30; 709/217, 219, 223, 227, 709/228, 229
See application file for complete search history.

(56) References Cited

U.S. PATENT DOCUMENTS

| | | | | |
|---|---|---|---|---|
| 2003/0131257 A1* | 7/2003 | Frantz et al. | | 713/201 |
| 2004/0039924 A1* | 2/2004 | Baldwin et al. | | 713/189 |
| 2005/0071677 A1* | 3/2005 | Khanna et al. | | 713/201 |
| 2005/0213768 A1* | 9/2005 | Durham et al. | | 380/278 |
| 2005/0216577 A1* | 9/2005 | Durham et al. | | 709/223 |
| 2005/0283826 A1* | 12/2005 | Tahan | | 726/2 |
| 2006/0026422 A1* | 2/2006 | Bade et al. | | 713/164 |
| 2006/0048228 A1* | 3/2006 | Takemori et al. | | 726/22 |
| 2006/0072762 A1* | 4/2006 | Buer | | 380/277 |
| 2006/0085844 A1* | 4/2006 | Buer et al. | | 726/4 |
| 2006/0248082 A1* | 11/2006 | Raikar et al. | | 707/9 |
| 2006/0256108 A1* | 11/2006 | Scaralata | | 345/418 |
| 2007/0217344 A1* | 9/2007 | Krywaniuk | | 370/254 |
| 2007/0266421 A1* | 11/2007 | Vaidya et al. | | 726/1 |
| 2008/0059799 A1* | 3/2008 | Scarlata | | 713/176 |
| 2008/0060068 A1* | 3/2008 | Mabayoje et al. | | 726/9 |

\* cited by examiner

*Primary Examiner* — Eleni Shiferaw
*Assistant Examiner* — Hilary Branske

(57) ABSTRACT

Cryptographic keys are distributed to computer systems to be remotely managed by a management node. First secure channels are established between the management node and trusted computing platforms associated with the computer systems. Cryptographic keys are sent to the trusted computing platforms via the first secure channels, wherein the cryptographic keys are stored in the trusted computing platforms and retrieved from the trusted computing platforms by the computer systems. Second secure channels are established with the computer systems using the retrieved cryptographic keys. Commands are remotely executed on one or more of the computer systems via the second secure channels.

16 Claims, 7 Drawing Sheets

CRYPTOGRAPHIC KEY DISTRIBUTION USING A TRUSTED COMPUTING PLATFORM

BACKGROUND

Conventionally, servers in a data center are remotely managed via a network, such as the Internet, by establishing a secure connection between a remote management node and the servers. For example, a secure shell connection is established between a management node and a system being managed in a data center. Then, the management node may run commands on the server via the secure shell, such as commands for configuring the server, providing software updates, etc. However, to set up the secure shell and to run commands remotely, a public key of the management node needs to be associated with administrative rights on the server. This is usually a manual process and requires the administrator to know a user id and password granting administrator rights to login to the server with the necessary rights. When logged in with administrator rights, the public key is stored in a predetermined file and/or directory, which can only be created, stored or accessed by a user or application with administrator rights. For example, in LINUX, an administrator must login to the server as user 'root' and create a file containing the public key of the management node in a directory owned by user 'root' that can only be accessed with administrator rights. In WINDOWS, an administrator must know the administrative login ID as well as the password to login with administrator rights to store the public key of the management node in a particular directory on the server. Then, the server may receive commands from the management node signed with the private key of the management node and verify the rights of the management node to issue the commands using the stored public key of the management node and safely run the commands and automated scripts.

Requiring an administrator to know the administrator password for every computer being remotely managed becomes problematic, especially in data centers or for networks including hundreds or even thousands of computers. The administrator may resort to recording all the passwords in paper or electronic form, which becomes a security liability, or the administrator may use the same password for every computer, which is also a security liability. Furthermore, requiring an administrator to go through the manual process of determining the administrator login ID and password and entering the administrator login ID and password can be very time consuming and costly, especially when a large number of computers are being managed.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF THE EMBODIMENTS

In the following detailed description, references are made to the accompanying figures, which illustrate specific embodiments. Changes may be made to the embodiments without departing from the spirit and scope of the embodiments.

According to an embodiment, trusted computing platforms are provided for computer systems. Cryptographic keys for establishing secure channels and for remotely managing the computer systems are sent to the computer systems via the trusted computing platforms, which allows the computer systems to be remotely managed without performing manual tasks, such as manual entry of administrator IDs and passwords.

Figure 1:
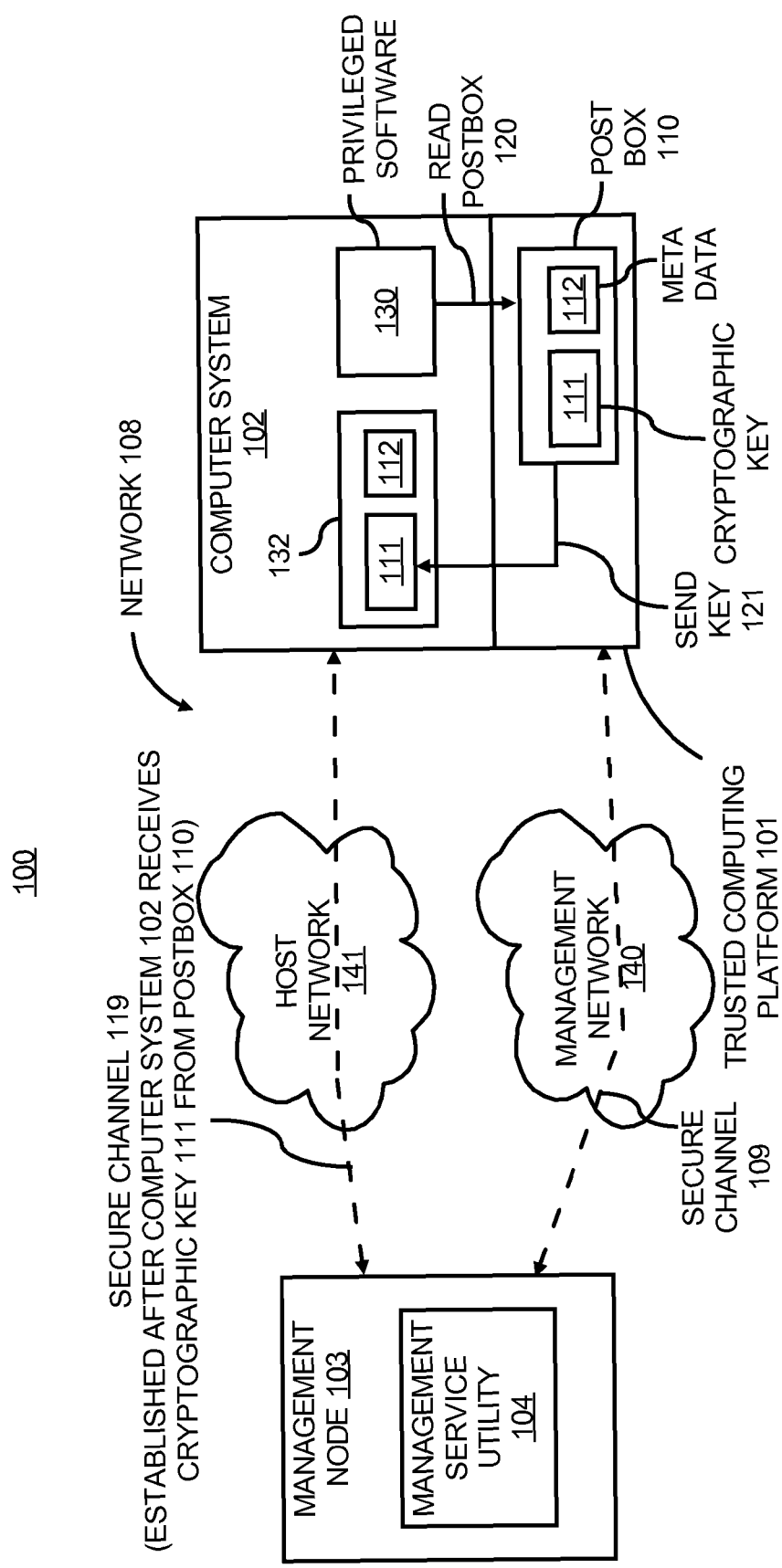
FIG. 1 illustrates a system operable to provide a cryptographic key to a computer system through a trusted computing platform, according to an embodiment.

FIG. 1 illustrates a system 100, according to an embodiment. The system 100 includes a management node 103, a trusted computing platform 101 and a computer system 102. The management node 103 is a computer system running a management service utility 104 for remotely managing one or more computer systems via a network 108. The management service utility 104 is software operable to perform remote management functions for computer systems, including the computer system 102. Examples of remote management functions may include boot service and remote desktop service, monitoring hardware and software, performing software updates, and other remote computer management functions as are known in the art.

According to an embodiment, the management service utility 104 running on the management node 103 distributes cryptographic keys to trusted computing platforms associated with computer systems to authenticate future remote management actions on those computer systems. A trusted computing platform, such as the trusted computing platform 101, is associated with a computer system to be remotely managed, such as the computer system 102, but is independent of the associated computer system. A trusted computing platform may include a processor and memory that is distinct from a processor and memory of the computer system and may include a power source distinct from the power source of the associated computer system. The trusted computing platform also operates independently of the associated computer system and is secured. For example, the processor and other hardware in the trusted computing platform may be functioning regardless of whether the associated computer is turned on. Furthermore, the trusted computing platform includes safeguards to prevent users of the associated computer system from accessing the trusted computing platform. For example, the trusted computing platform cannot be accessed by applications running on the associated computer system or users unless those applications are privileged, and even then the access is limited to reading information from the trusted computing platform. That is an application must have special rights or must be authenticated by the trusted computing platform before the trusted computing platform will communicate with the application. In one embodiment, the trusted computing platform may include software for performing management functions on the associated computer system, such as powering on or off or rebooting the associated computer system, monitoring temperature and other attributes of the associated computer system, and network security to establish a secure network connection and communicate with a remote management node.

An associated computer system may include a server, a blade server, or any type of computer system to be remotely managed. In one embodiment, the trusted computing platform is in the associated computer system. For example, the trusted computing platform may be on the motherboard for the associated computer system. In another embodiment, the trusted computing platform is separated from the associated computer system but in electrical communication with the associated computer system.

The trusted computing platform 101 and the management node 103 communicate with each other via a secure channel 109, for example, in a management network 140. The management network 140, including the secure channel 109, is used to securely communicate between the management node 103 and the trusted computing platform 101. The management network 140 is a trusted network, such that nodes communicating on the management network 140 assume that the communications are safe from unauthorized access.

The management node 103 distributes a cryptographic key to the trusted computing platform 101 via the secure channel 109 in the management network 141. The cryptographic key 111 will eventually be sent to the associated computer system 102 and be used by the computer system 102 to authenticate the management node 103. This may include using the cryptographic key 111 to authenticate the management node 103 when it establishes a secure channel to the computer system 102.

FIG. 1 shows a cryptographic key 111 received from the management node and stored in the trusted computing platform 101. In one embodiment, the cryptographic key 111 is the public key of the management node 103 that is used to establish the secure channel 119 in a host network 141 through a public key authentication protocol. The secure channel 119 between the management node 103 and the associated computer system 102 may be established using secure shell or another security protocol. For example, after distributing the public key of the management node 103 via the trusted computing platform 101 to the computer system 102, the public key may be used to authenticate the management node 103 for establishing the secure channel 119 with the management node 103. Then, the management node 103 may remotely execute commands on the associated computer system 102.

Secure shell, also referred to as SSH, which may be used for the secure channel 119, is a set of standards that allows establishing a secure channel between a local and a remote computer. SSH provides confidentiality and integrity of data exchanged between the two computers using encryption and message authentication codes. SSH is typically used to log into a remote machine and execute commands, but it also supports tunneling, forwarding arbitrary TCP ports and X11 connections; it can transfer files using the associated SFTP or SCP protocols. SSH is one example of a protocol that may be used to establish a secure channel by mutual authentication of the management node 103 and the computer system 102. Other protocols may also be used.

As described above, two networks are shown in FIG. 1. The management network 140 is a trusted network used for communicating between the management node 103 and trusted computing platforms. The host network 141 is a network used for communicating between the management node 103 and the computer systems. It will be apparent to one of ordinary skill in the art that the management network 140 and the host network 141 may be logical networks using the same underlying physical network. The networks may differ in that they have different security and communication models. For example, the management network 140 may have a security model designed for use by a system administrator to login to several trusted computing platforms and has built in security measures. That is once an administrator is logged in, the administrator securely accesses one or more of the trusted computing platforms. The host network 141 may use a more conventional point-to-point communications model that requires an application, such as an SSH client or other software to establish secure channels therein.

As shown in FIG. 1, the cryptographic key 111 is passed from the management node 103 to the associated computer system 102 through the trusted computing platform 101. In particular, the trusted computing platform 102 receives the cryptographic key 111 and stores the cryptographic key 111 in the postbox 110. The postbox 110 may include predetermined memory locations or other storage in the trusted computing platform 101. An application program interface (API) can be used to access the postbox 110 and modify meta data in the postbox 110.

Privileged software 130 retrieves the cryptographic key 111 from the postbox 110 in the trusted computing platform 101 and stores the cryptographic key 111 in a predetermined location in the associated computer system 102. The predetermined location, shown as privileged location 132, is a location that can only be accessed by a user or application with certain rights. Then, using the cryptographic key 111, the associated computer system 102 authenticates the management node 103 and establishes the secure channel 119 with the management node 103. Using the secure channel 119, the management node may run commands on the associated computer system 102, install software and perform other management functions.

The privileged software 130 is software with rights to access the trusted computing platform 101. This may include a privileged driver, which is interface control software responsible for communicating with the hardware, i.e., the trusted computing platform 101, and operates at a privileged level in an operating system in the associated computer system 102. Other applications running on the associated computer system 102 are typically precluded from accessing the trusted computing platform 101 and are also precluded from affecting the privileged driver.

The privileged software 130 gets information, such as the cryptographic key 111 and/or meta data or other keys, from the postbox 110. This action is shown as read postbox 120 in FIG. 1. The cryptographic key 111 is sent to the associated computer system 102, shown as send key 121, and stored, for example, in the privileged location 132. The privileged software 130 has rights to access the privileged location 132. For example, the privileged software 130 may have rights to read or write a file including the cryptographic key 111 to a predetermined directory that can only be accessed by a user or application with administrator rights.

To establish the secure channel 119, for example based on the secure shell standards, software in the computer system 102 may have to retrieve the key 111 from the privileged location 132. The privileged location 132 may only be accessed by an application or user with administrator rights, so a cryptographic key stored in the privileged location 132 is presumed to be authentic. For example, for LINUX, secure shell requires that the public key be in a special file in a root directory to establish a secure channel, such as the secure channel 119.

As described above, the management node 103 distributes the cryptographic key 111 via the secure channel 109 in the management network 140 for storing the cryptographic key 111 in the postbox 110, and establishes the secure channel 119 in the host network 141 with the computer system 102 using the cryptographic key 111. In addition to performing those functions, the management node 103 may send the cryptographic key 111 and meta data 112 to the trusted computing platform 101 for storage in the postbox 110, send a new key and meta data to the to the trusted computing platform 101 for storage in the postbox 110, for example, when the current key expires, and delete or otherwise invalidate the key and meta data in the trusted computing platform 101 in the postbox 110, for example to disable applications on the computer system 102. Examples of the meta data 112 may include available-bit, sever name (e.g., the name or ID of the management node 103), and key expiration date.

The cryptographic key 111 may only be valid for a specific period of time, with a key expiration date being the expiration date for the cryptographic key 111. The management node 103 may send a new cryptographic key to the trusted computing platform 102 when the current cryptographic key expires. Also, multiple cryptographic keys may be distributed at a single time, and each may be used for authenticating the management node 103.

The management node 103 may set the available-bit in the meta data 112 in the postbox 110 to indicate to the privileged software 130 that a new cryptographic key is stored in the postbox 110. The privileged software 130 may periodically check the available-bit to determine whether to retrieve the cryptographic key and meta data from the postbox 110 and reset the available-bit after retrieving the key. The privileged software 130 may also check the expiration date for a cryptographic key stored in the associated computer system 102 to determine whether the cryptographic key is expired and not use the stored cryptographic key if it is expired.

The trusted computing platform 101 is a secured entity that is trusted by both the management node 103 and the associated computer system 102. Thus, data received from the trusted computing platform 101 is presumed to be authentic. Hence, by using the trusted computing platform 101 and the privileged software 130 to transfer the cryptographic key 111 from the management node 103 to the associated computer system 102, a system administrator with administrator rights does not need to manually log into the associated computer system 102 to store the cryptographic key 111 in the privileged location 132, which may only be accessible by an administrator with administrator rights to establish the secure channel 119 for allowing the management node 103 to remotely access the associated computer system 102.

Also, the cryptographic keys sent by the management node 103 may have an expiration date, which requires distributing keys periodically, possibly to a large number of computer systems. Distributing keys via the postbox is a highly scalable cryptographic key distribution technique that does not require a system administrator to manually log into each computer system. After the computer systems are deployed, the management node 103 may automatically discover all the trusted computing platforms using a discovery protocol, and then distribute the keys. Furthermore, the deployed computer systems do not need to be powered-on to distribute the cryptographic keys, because the trusted computing platforms are independent from the deployed computer systems.

Figure 2:
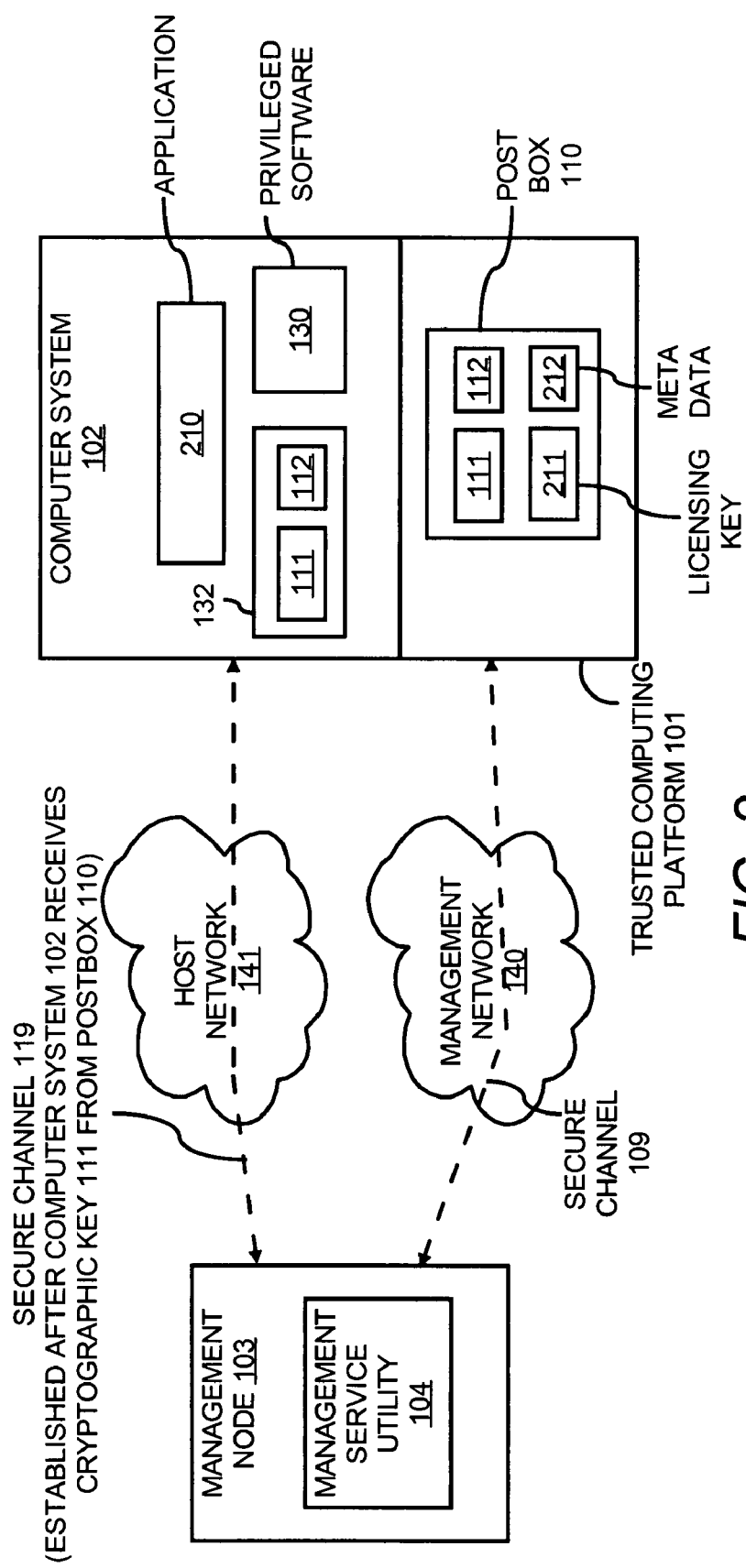
FIG. 2 illustrates a system operable to remotely disable an application running on a computer system through a trusted computing platform, according to an embodiment.

FIG. 2 illustrates a system operable to remotely disable an application running on a computer system through a trusted computing platform, according to an embodiment. The system shown in FIG. 2 is the same as the system shown in FIG. 1, except FIG. 2 shows an application 210 running on the computer system 102 and a licensing key 211 and associated meta data 212 stored in the postbox 110.

The application 210 needs the licensing key 211 to run. For example, the application 210 requests the privileged software 130 to check for the licensing key 211 prior to running. The privileged software 130 retrieves the licensing key 211 and the meta data 212 from the postbox 110. If there is no licensing key 211 or if the expiration date for the licensing key, which is provided in the meta data 212, indicates that the licensing key 211 is expired, the privileged software 130 sends an indication to the application 211 that the licensing key 211 is unavailable and the application 210 will not run.

The licensing key 211 and meta data 212 may be sent to the trusted computing platform 101 via the secure channel 109 from the management node 103. The management service utility or another service utility running on the management node may be responsible for managing the licensing keys and distributing or revoking the licensing keys. For example, the utility running on the management node 103 may disable the application 210 by instructing the trusted computing platform 101 to delete the licensing key 211 and meta data 212 from the postbox 110. Alternatively, the expiration date for the licensing key 211 may be changed to disable or enable the application 210.

Figure 3:
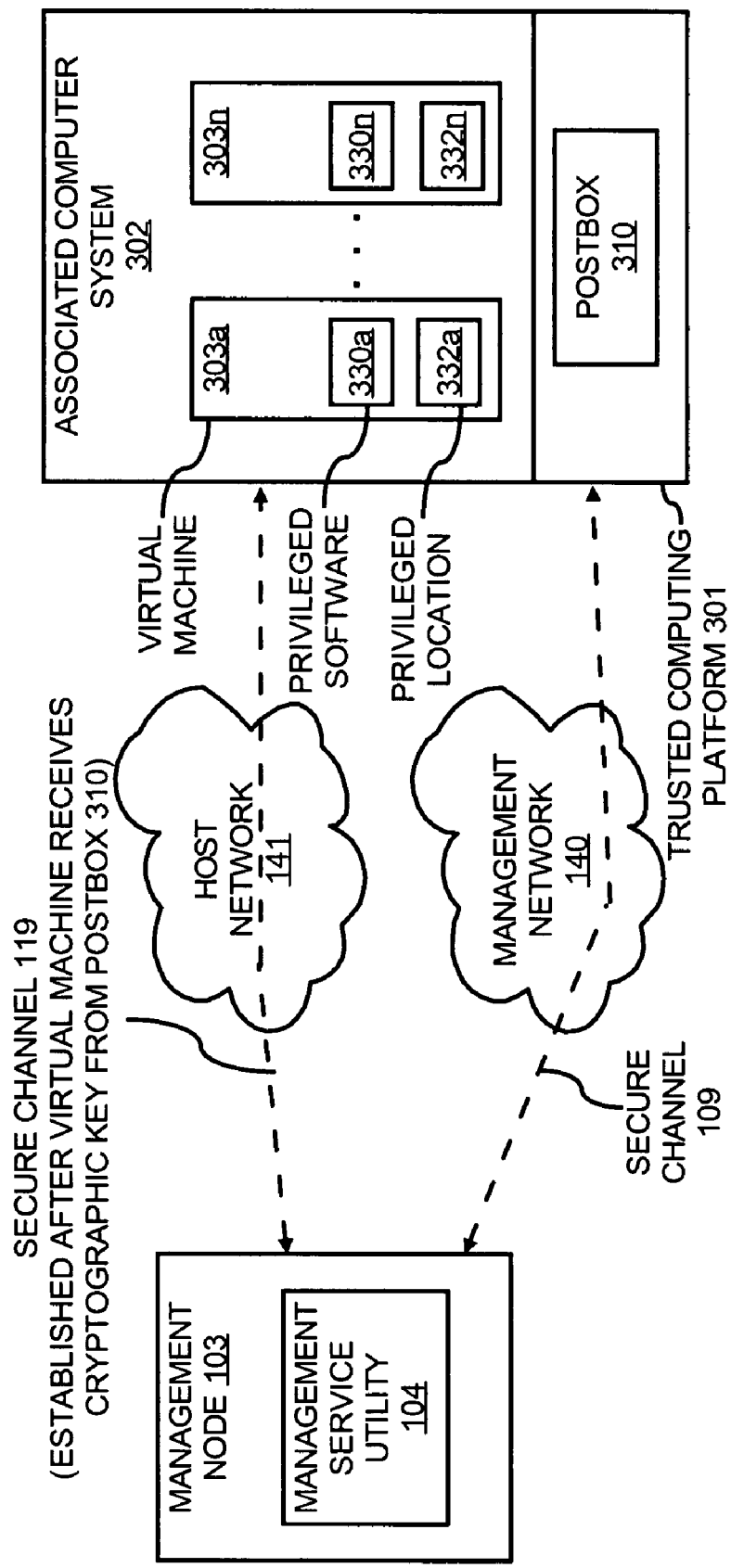
FIG. 3 illustrates a system operable to provide a cryptographic key to virtual machines through a trusted computing platform, according to an embodiment.

FIG. 3 illustrates an embodiment, where a computer system 302 runs virtual machines 303*a*-*n*. A virtual machine is an execution environment on a computer system. Typically multiple virtual machines may be created on a single computer system, and each virtual machine has an operating system. Different applications may be installed on the virtual machines. Portions of the computer system's resources, such as processors, memory, hard drives, etc., may be allocated to each virtual machine.

The virtual machines 303*a*-*n* may include privileged software 330*a*-*n*, similar to the privileged software 130 described with respect to FIG. 1, for retrieving cryptographic keys from the postbox 310. The management node 103 may store cryptographic keys and meta data for the cryptographic keys in the postbox 310 and send the cryptographic keys via a secure channel to the trusted computing platform 301, similarly as described with respect to FIG. 1. A different cryptographic key may be provided for each virtual machine or the same cryptographic key may be used for each virtual machine 303*a*-*n*. Also, although not shown, a different post box may be provided for each virtual machine 303*a*-*n*. The privileged software 330*a*-*n* retrieves the cryptographic keys from the postbox 310 and stores them in the privileged locations 332*a*-*n*. Then, the management node 103 may establish a secure channel with the virtual machines 303*a*-*n* and remotely execute commands on the virtual machines 303*a*-*n*. Although not shown, the management node 103 may disable applications running on the virtual machines 303*a*-*n*, such as described with respect to FIG. 2.

Figure 4:
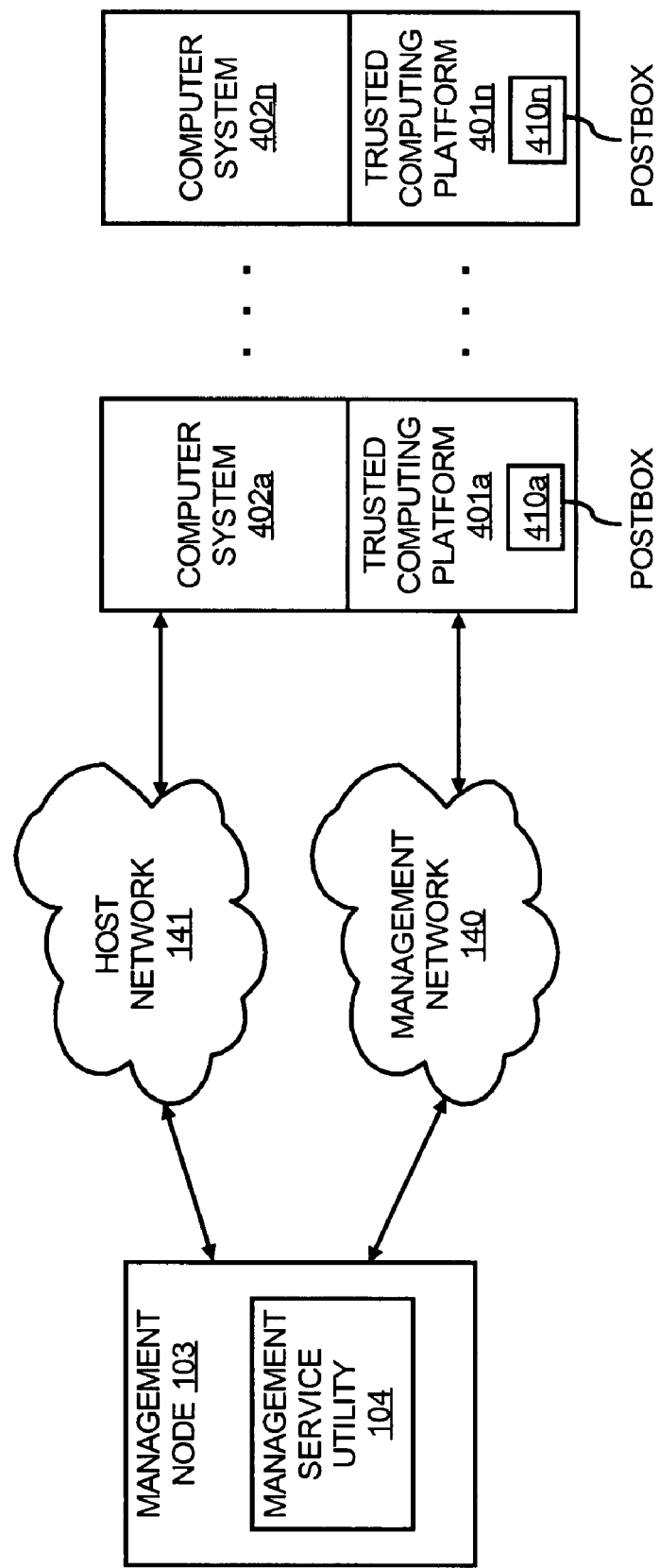
FIG. 4 illustrates a system operable to provide a cryptographic key to multiple computer systems through trusted computing platforms, according to an embodiment.

Typically, the management service utility 104 running on the management node 103 is operable to manage multiple computer systems, such as many servers in a data center. FIG. 4 illustrates the management node 103 managing multiple computer systems 402*a*-*n*, according to an embodiment. Although not shown, the computer systems 402*a*-*n* include one or more of the features shown in FIGS. 1-3. For example, the computer systems 402*a-n* are all operable to receive cryptographic keys from the management service utility 104 running on the management node 103 via an associated trusted computing platform, such as described with respect to FIG. 1. Licensing keys may be used for one or more of applications running on one or more of the computer systems 402*a-n*, such as described with respect to FIG. 2. Also, one or more of the computer systems 402*a-n* may include virtual machines, such as described with respect to FIG. 3.

The management service utility 104 shown in FIG. 4 is operable to remotely manage the computer systems 402*a-n*. Each of the computer systems 402*a-n* has a respective trusted computing platform of the trusted computing platforms 401*a-n*, similar to the trusted computing platform 101 and the associated computer system 104 shown in FIG. 1. The management node 103 distributes a cryptographic key to each of the trusted computing platforms 401*a-n* for storage in the postboxes 410*a-n*. The computer systems 402*a-n* extract the cryptographic keys from the post boxes 410*a-n* and store the cryptographic keys in a predetermined location, such as a root, such as described with respect to FIG. 1. The management network 140 may be used to distribute the cryptographic keys to the trusted computing platforms 401*a-n*, and the host network 141 may be used to communicate commands via secure channels to the associated computer systems 402*a-n*.

Figure 5:
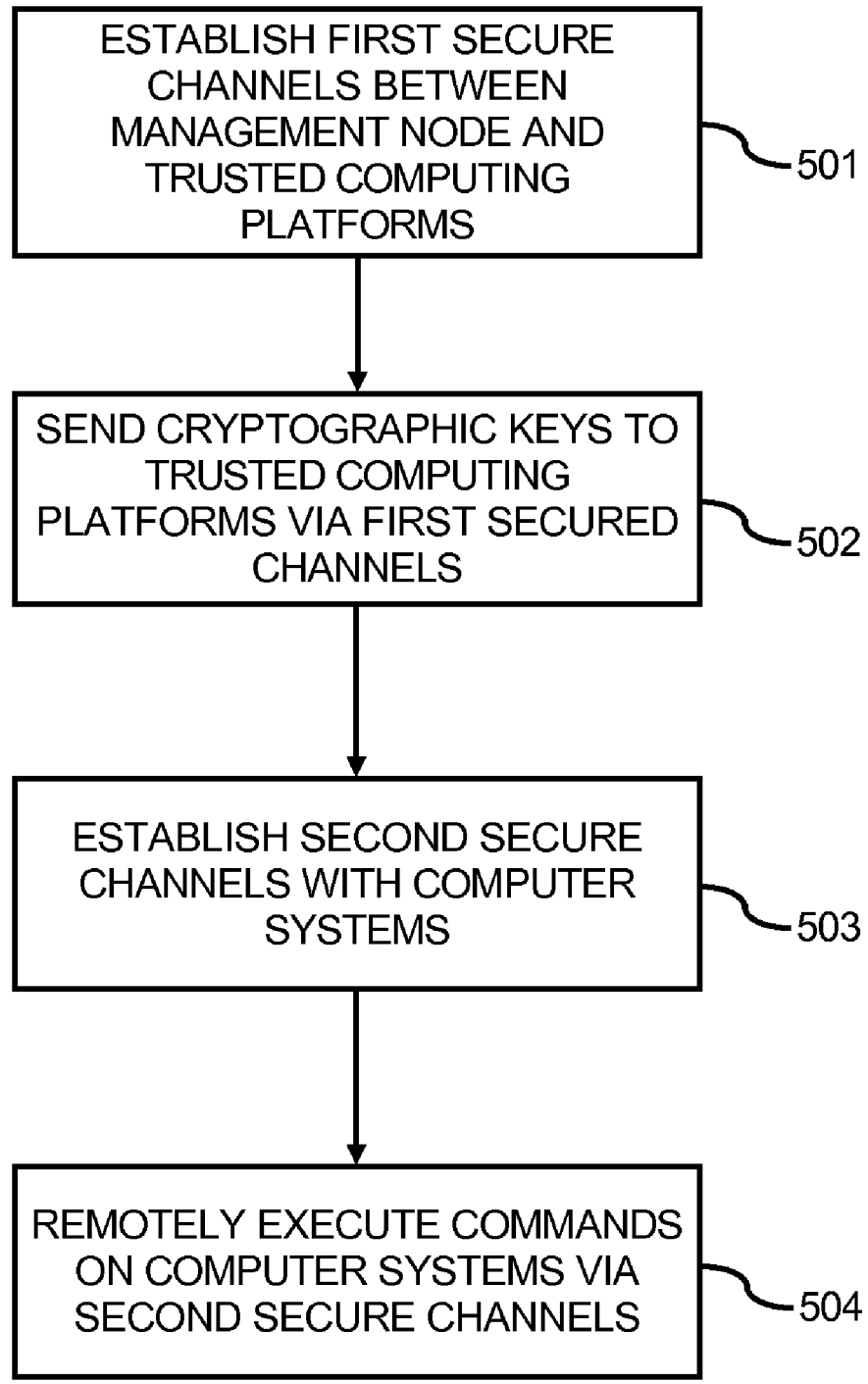
FIG. 5 illustrates a flowchart of a method for distributing cryptographic keys to computer systems to be remotely managed by a management node, according to an embodiment.

FIG. 5 illustrates a method 500 for distributing cryptographic keys to computer systems to be remotely managed by a management node, according to an embodiment. The method 500 is described with respect to FIGS. 1-4 by way of example and not limitation.

At step 501, first secure channels are established between a management node and trusted computing platforms for computer systems. For example, the management node 103 includes the management service utility 104, such as shown in FIGS. 1-3. A secure channel may include a method or technique for exchanging data that attempts to prevent interception or tampering of the data. Establishing first secure channels may include using the trusted management network 140 to communicate with the trusted computing platforms.

At step 502, the management service utility running on the management node sends cryptographic keys to the trusted computing platforms via the first secure channels. For example, the management service utility 104 sends cryptographic keys to the trusted computing platforms 401*a-n* shown in FIG. 4. This may include the same cryptographic key sent to each of the trusted computing platforms 401*a-n* or a same set of cryptographic keys sent to each of the trusted computing platforms 401*a-n*. Alternatively, different cryptographic keys may be sent to the trusted computing platforms 401*a-n*.

The cryptographic keys are stored in the trusted computing platforms 401*a-n* and retrieved from the trusted computing platforms 401*a-n* by the computer systems 402*a-n* and stored in the computer systems 402*a-n*. An example of storing a cryptographic key in a trusted computing platform and retrieving the cryptographic key for storage in a privileged location in the computer system is shown in FIG. 1. The cryptographic key may be a public key for the management service utility 104.

At step 503, the management service utility running on the management node establishes second secure channels with the computer systems using the stored cryptographic keys. For example, the secure channels may be secure shells, and the management service utility sends requests to set up the second secure channels encrypted with the public key to the computer systems. Secure channel 119 shown in FIG. 1 may be one of the first secure channels. The computer systems 402*a-n* shown in FIG. 4 retrieve the public keys from the privileged location to decrypt the requests, and establish the secure shells.

At step 504, the management service utility running on the management node remotely executes commands on one or more of the computer systems via the second secure channels. For example, after the computer systems 401*a-n* acknowledge the requests for setting up the secure shells, commands encrypted with the public key may be sent to the computer systems 401*a-n* for remotely managing the computer systems 401*a-n*. Management software on the computer systems decrypt the commands and execute the commands. Remotely executing commands may include running automated scripts or manually entering commands remotely executed on the computer systems.

Figure 6:
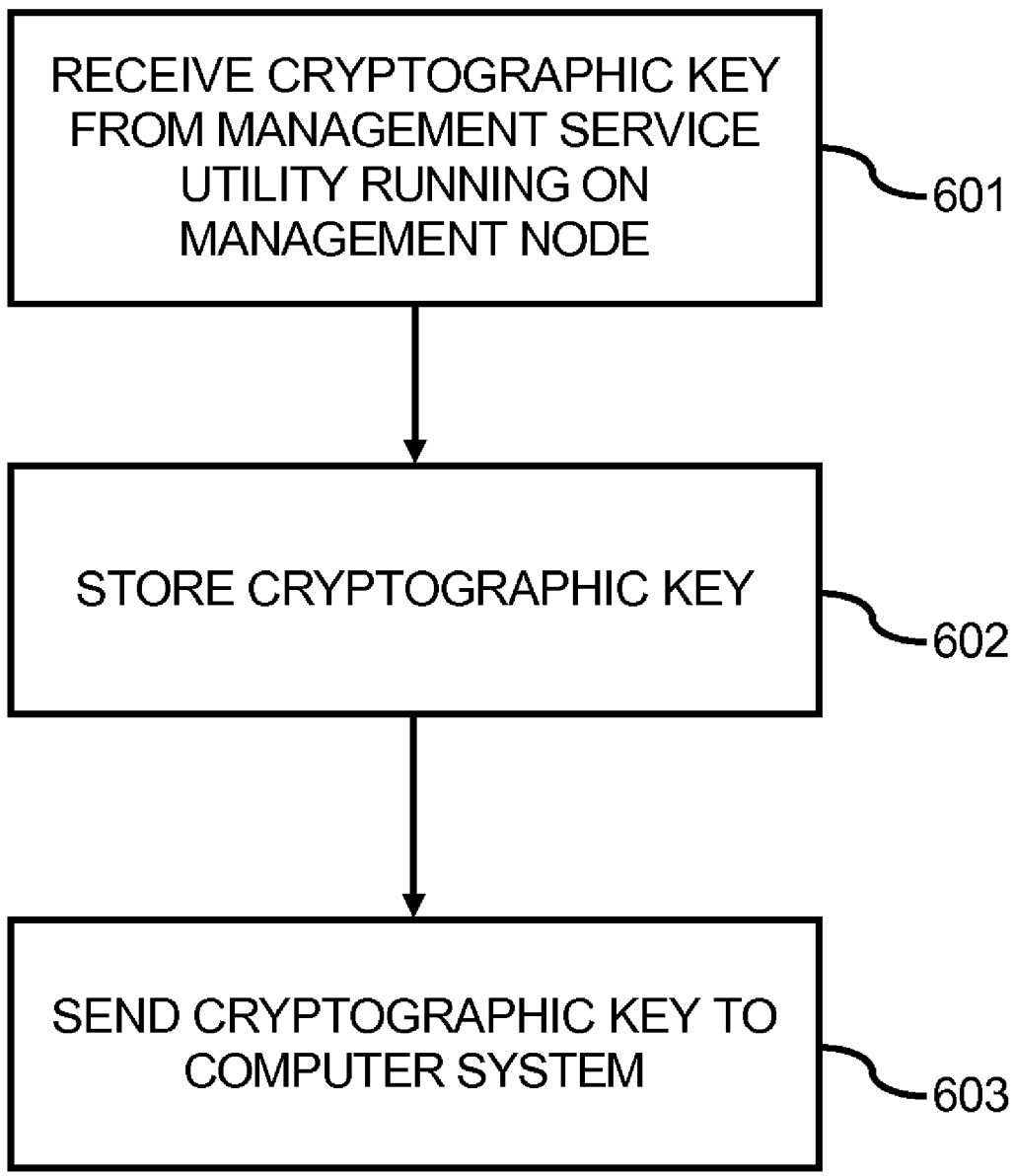
FIG. 6 illustrates a flowchart of a method for providing a cryptographic key to a computer system from a management node configured to remotely manage the computer system, according to an embodiment.

FIG. 6 illustrates a method 600 for providing a cryptographic key to a computer system from a management node configured to remotely manage the computer system, according to an embodiment. The method 600 is described with respect to FIGS. 1-4 by way of example and not limitation.

At step 601, a trusted computing platform receives a cryptographic key from a management service utility running on the management node via a first secure channel. For example, as shown in FIG. 1, the trusted computing platform 101 receives the cryptographic key 111 from the management node 103 via the secure channel 109.

At step 602, the trusted computing platform stores the cryptographic key. For example, the trusted computing platform 101 stores the cryptographic key 111 in the postbox 110. Meta data 112 received with the cryptographic key 112 may also be stored in the postbox 110.

At step 603, the trusted computing platform sends the cryptographic key to the computer system to be remotely managed by the management service utility running on the management node. For example, the trusted computing platform 101 sends the cryptographic key 111 to the computer system 102, as shown in FIG. 1. Then, the second secure channel 119 may be established using the cryptographic key 111 and used for remotely managing the computer system 102.

Figure 7:
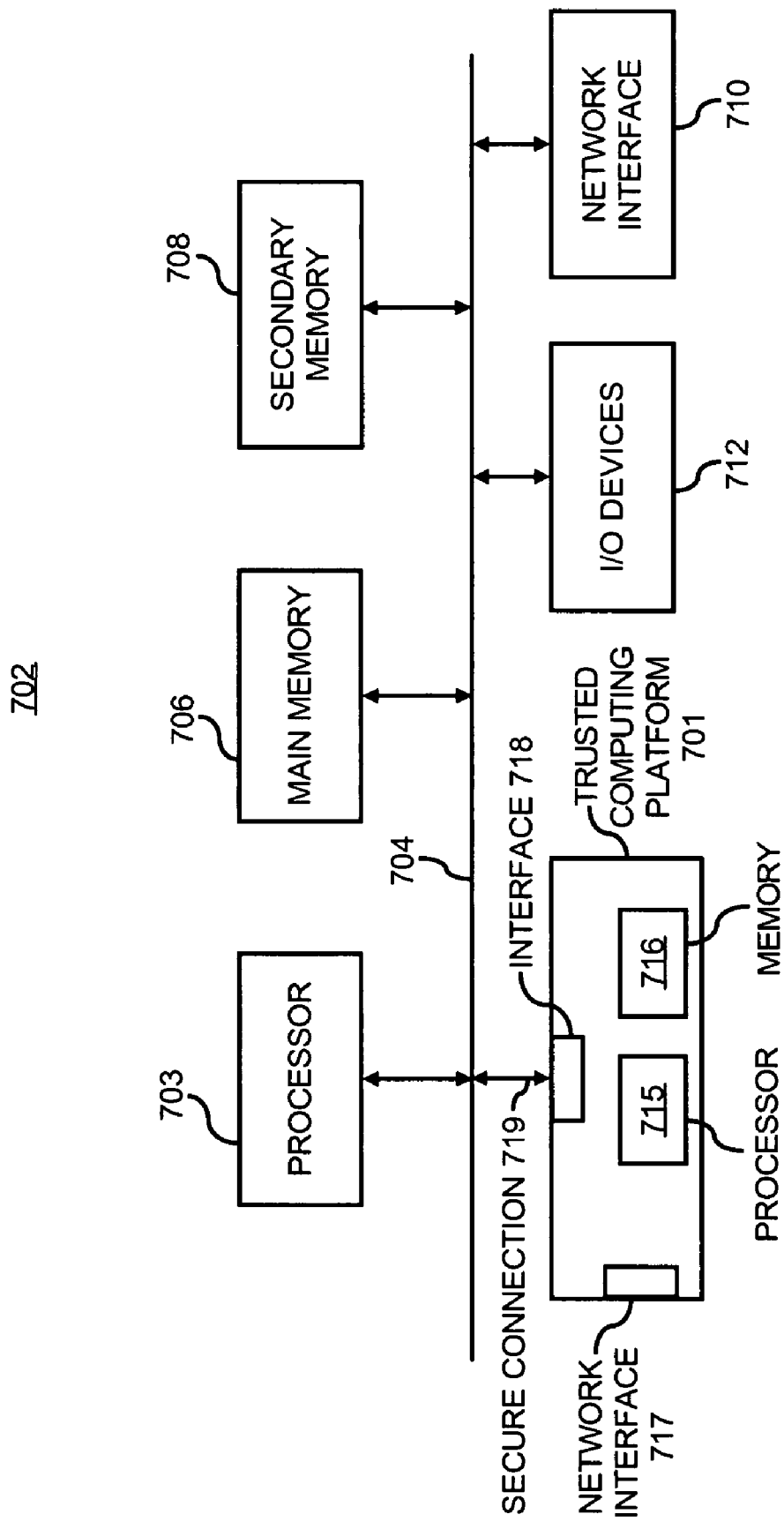
FIG. 7 illustrates a computer system, according to an embodiment.

FIG. 7 illustrates an exemplary block diagram of a computer system 702 with trusted computing platform 701. The computer system 702 may be used as a platform for any of the computer systems shown in FIGS. 1-4 that are to be remotely managed by the management service utility 104 running on the management node 103.

The computer system 702 includes one or more processors, such as processor 703, providing an execution platform for executing software. Software may include but is not limited to an operating system, applications, privileged software (e.g., the privileged software 130 shown in FIG. 1), and a client for establishing a secure channel for remotely executing commands from the management node 103. Instead of a processor, other circuits may be used to perform the functions described herein, such as an ASIC or other circuits designed to perform the functions.

Commands and data from the processor 703 are communicated over a communication bus 704. The computer system 702 also includes a main memory 706, such as a random access memory (RAM), where software may be resident during runtime, and a secondary memory 708. The secondary memory 708 includes, for example, a hard disk drive or other type of storage device. Other examples of the secondary memory 708 include ROM (read only memory), EPROM (erasable, programmable ROM), EEPROM (electrically erasable, programmable ROM).

The computer system 702 optionally includes user interfaces comprising one or more input/output (I/O) devices 712, such as a keyboard, a mouse, a stylus, display, speakers, and the like. A network interface 710 is provided for communicating with other computer systems, such as the management node 103.

The computer system 702 also includes a trusted computing platform 701. The trusted computing platform 701 may include processor 715 and a memory 716. The postbox 710 shown in FIG. 1 may be provided in the memory 716. The trusted computing platform 701 also includes a network interface 717 for communicating with other computer systems, such as the management node 103. The trusted computing platform 701 also includes an interface 718 connecting the trusted computing platform 701 to the computer system 702 via a secured connection 719. The secure connection 719 may be a wired connection to the bus 704. The trusted computing platform 701 may include other components not shown, such as an independent power supply, etc.

The trusted computing platform 701 may run software, such as an operating system and a client for establishing a secure channel with the management node 103. Software may also include software for monitoring the temperature and other attributes of the computer system 702 and for performing computer management functions.

It will be apparent to one of ordinary skill in the art that FIG. 7 is meant to illustrate a generic computer system. Any type of computer system may be used. Furthermore, one or more components of the components of the computer system 702 are optional. The computer system 702 may include more or less features depending on the complexity of the system needed.

One or more of the steps of the methods 500 and 600 described herein may be implemented as software embedded on a computer readable medium. Examples of the computer readable medium may include memories 706, 708 and 716. The steps may be executed by the processor 703 or the processor 715. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of distributing cryptographic keys to computer systems to be remotely managed by a management node, the method comprising:
    establishing first secure channels between the management node and trusted computing platforms associated with the computer systems, wherein establishing first secure channels between the management node and trusted computing platforms associated with the computer systems further comprises using a trusted management network to communicate between the management node and trusted computing platforms;
    sending cryptographic keys to the trusted computing platforms via the first secure channels, wherein the cryptographic keys are stored in the trusted computing platforms and retrieved from the trusted computing platforms by the computer systems and stored in the computer systems; and
    establishing second secure channels with the computer systems using the stored cryptographic keys, wherein establishing second secure channels with the computer systems using the stored cryptographic keys further comprises using a host network to communicate between the management node and the computer systems; and
    remotely executing commands on one or more of the computer systems via the second secure channels.

2. The method of claim 1, wherein each trusted computing platform is independent from its associated computer system and includes safeguards to prevent users of the associated computer system from accessing the trusted computing platform.

3. The method of claim 1, wherein the cryptographic keys sent to the trusted computing platforms are stored in privileged locations in the computer systems without having to manually log into the computer systems as a user with privileges to access the privileged locations.

4. The method of claim 1, wherein the cryptographic keys are stored in postboxes in the trusted computing platforms.

5. The method of claim 4, wherein each computer system includes privileged software configured to retrieve a stored cryptographic key from a postbox in a trusted computing platform and store the cryptographic key in a privileged location in the computing system so the management node is operable to securely communicate with the computer system to manage the computer system.

6. The method of claim 1, further comprising:
    sending new cryptographic keys to the trusted computing platforms via the first secure channels if the cryptographic keys expire, wherein the new cryptographic keys are stored in the trusted computing platforms and retrieved from the trusted computing platforms by the computer systems and stored in the computer systems for authenticating the management node.

7. The method of claim 1, further comprising:
    sending a licensing key to one of the trusted computing platforms, wherein the licensing key is stored in the trusted computing platform and used by the computer system associated with the trusted computing platform to run an application.

8. The method of claim 7, further comprising:
    sending instructions to the trusted computing platform to delete the licensing key or to change an expiration date for the licensing key to prevent the application from running.

9. The method of claim 1, further comprising:
sending at least one cryptographic key to at least one of the trusted computing platforms, wherein the at least one cryptographic key is for virtual machines running on the associated computer system for the at least one of the trusted computing platforms and used to authenticate the management node.

10. The method of claim 1, further comprising:
sending encrypted commands directly from the management node to the computer systems via the second secure channels such that the trusted computing platforms do not receive the encrypted commands.

11. The method of claim 1, wherein the cryptographic keys are a public key for the management node and establishing second secure channels with the computer systems using the stored cryptographic keys comprises:
establishing a secure shell with each of the computer systems using the public key.

12. A method of providing a cryptographic key to a computer system from a management node configured to remotely manage the computer system, the method comprising:
receiving a cryptographic key from the management node at a trusted computing platform for the computer system via a first secure channel, wherein the first secure channel is established between the management node and the trusted computing platform and uses a trusted management network to communicate between the management node and the trusted computing platform;
storing the cryptographic key in the trusted computing platform; and
sending the cryptographic key to the computer system, wherein the computer system is configured to establish a second secure channel with the management node using the cryptographic key, wherein the second secure channel is established between the computer system and the management node and uses a host network to communicate between the computer system and the management node, and the management node is configured to remotely execute commands on the computer system via the second secure channel.

13. The method of claim 12, wherein storing the cryptographic key comprises storing an encryption in a postbox in the trusted computing platform.

14. The method of claim 13, wherein privileged software running on the computer system is configured to retrieve the cryptographic key from the postbox and store the cryptographic key in a privileged location in the computer system.

15. The method of claim 12, further comprising:
receiving a new cryptographic key from the management node if the cryptographic key expired; and
storing the new cryptographic key in the trusted computing platform, wherein the new cryptographic key is retrieved from the trusted computing platform by the computer system and stored in the computer system.

16. The method of claim 12, further comprising:
receiving instructions from the management node or the computer system to delete the cryptographic key; and
deleting the cryptographic key from the trusted computing platform.

* * * * *